US009750987B2

(12) United States Patent
Battigello

(10) Patent No.: US 9,750,987 B2
(45) Date of Patent: Sep. 5, 2017

(54) SUPPORT FOR BALLS AND A BICYCLE PROVIDED WITH THE SUPPORT FOR BALLS

(71) Applicant: Massimiliano Battigello, Reggio Emilia (IT)

(72) Inventor: Massimiliano Battigello, Reggio Emilia (IT)

(*) Notice: Subject to any disclaimer, the term of this patent is extended or adjusted under 35 U.S.C. 154(b) by 0 days.

(21) Appl. No.: 14/815,311

(22) Filed: Jul. 31, 2015

(65) Prior Publication Data

US 2016/0031508 A1    Feb. 4, 2016

(30) Foreign Application Priority Data

Aug. 1, 2014 (IT) .............................. RE2014A0070

(51) Int. Cl.
| A63B 47/00 | (2006.01) |
| H01J 9/00 | (2006.01) |
| H01K 3/32 | (2006.01) |
| A63B 71/00 | (2006.01) |
| B62J 11/00 | (2006.01) |
| B62J 7/04 | (2006.01) |
| F16B 2/22 | (2006.01) |

(52) U.S. Cl.
CPC .......... *A63B 47/00* (2013.01); *A63B 71/0036* (2013.01); *B62J 7/04* (2013.01); *B62J 11/00* (2013.01); *F16B 2/22* (2013.01); *H01J 9/003* (2013.01); *H01K 3/32* (2013.01)

(58) Field of Classification Search
CPC ... B62J 11/00; B62J 7/04; A63B 47/00; A63B 71/0036; F16B 2/22; H01K 3/32; H01J 9/003

USPC .......... 248/603; 224/427, 462, 558; 211/14; 294/19.2; 206/315.9
See application file for complete search history.

(56) References Cited

U.S. PATENT DOCUMENTS

| 491,558 A * | 2/1893 | Hill ........................... F41B 3/00 124/41.1 |
| 809,985 A * | 1/1906 | Rundberg ................ H01K 3/32 292/17 |
| 1,265,850 A * | 5/1918 | Wierszewska .......... B60B 33/08 16/26 |
| 1,362,471 A * | 12/1920 | Brockschmidt ...... A01D 46/247 294/19.2 |

(Continued)

FOREIGN PATENT DOCUMENTS

FR          2957814 A1     9/2001

OTHER PUBLICATIONS

European Search Report dated Oct. 7, 2015 for corresponding application EP 15179237.

*Primary Examiner* — Eret McNichols
(74) *Attorney, Agent, or Firm* — Volpe and Koenig, P.C.

(57) ABSTRACT

A support for balls (2) includes a receiving element (21) provided with a plurality of gripping resilient and arched members (210) adapted to define a gripping volume (211) of a ball. Each gripping member (210) has an end (214) constrained in a joining body (212) and a free end (215), a coupling body (22) adapted to constrain the receiving element (21) to a tubular support structure (100), wherein the coupling body (22) is constrained to the receiving element (21) by a longitudinal spacer element (23), whose first end (2309) is constrained to the coupling body (22) and a second end (231) is constrained to the receiving element (21).

9 Claims, 8 Drawing Sheets

(56) References Cited

U.S. PATENT DOCUMENTS

| | | | | |
|---|---|---|---|---|
| 1,368,717 A * | 2/1921 | Gosar | ............... | H01K 3/32 81/53.12 |
| 1,658,145 A * | 2/1928 | Nao Uyei | ............... | A63B 47/02 294/166 |
| 1,764,278 A * | 6/1930 | Odin Olby | ............... | H01K 3/32 24/567 |
| 2,021,529 A * | 11/1935 | Tate | ............... | H01K 3/32 24/488 |
| 2,526,084 A * | 10/1950 | Penn | ............... | H01K 3/32 294/19.2 |
| 2,766,060 A * | 10/1956 | Fuller | ............... | H01K 3/32 81/53.11 |
| 2,833,584 A * | 5/1958 | McEvoy | ............... | A63B 47/02 294/19.2 |
| D238,628 S * | 2/1976 | Davis | ............... | D3/221 |
| 4,063,637 A * | 12/1977 | Danforth | ............... | A42B 3/006 206/8 |
| 4,069,956 A | 1/1978 | Shearer, Sr. et al. | | |
| 4,244,497 A * | 1/1981 | Lee | ............... | B62J 7/06 224/420 |
| 4,663,996 A * | 5/1987 | Grudgfield | ............... | H01K 3/32 294/99.1 |
| D371,904 S * | 7/1996 | Lee | ............... | D3/221 |
| 5,775,559 A * | 7/1998 | Mechanic | ............... | B62J 9/003 224/421 |
| 6,123,282 A * | 9/2000 | Richman | ............... | A63B 43/007 242/400 |
| 6,227,426 B1 * | 5/2001 | Martin | ............... | B62J 9/003 224/421 |
| D450,923 S * | 11/2001 | Helmreich | ............... | D3/221 |
| 6,454,105 B1 | 9/2002 | Medina | | |
| 6,601,711 B1 * | 8/2003 | Knable, III | ............... | A47F 5/0838 211/14 |
| 6,666,339 B2 * | 12/2003 | Platek | ............... | A47F 7/00 211/120 |
| D532,197 S | 11/2006 | Niksich | | |
| 7,255,024 B2 * | 8/2007 | Johnson | ............... | H01K 3/32 81/53.1 |
| 7,384,347 B2 * | 6/2008 | Milne | ............... | A63B 47/02 294/19.2 |
| 7,500,570 B2 * | 3/2009 | Kurcheski | ............... | A63B 47/00 211/14 |
| 7,713,136 B1 * | 5/2010 | Colucci | ............... | A63B 47/02 294/19.2 |
| 7,960,686 B2 * | 6/2011 | Henderson | ............... | A61B 6/12 250/252.1 |
| D669,720 S * | 10/2012 | Rieger, Sr. | ............... | D6/552 |
| D696,872 S * | 1/2014 | Tran | ............... | D6/552 |
| D696,873 S * | 1/2014 | Tran | ............... | D6/552 |
| 8,627,952 B2 * | 1/2014 | Glinert | ............... | A63B 47/00 206/315.9 |
| D711,644 S * | 8/2014 | Leach | ............... | D3/257 |
| 9,320,371 B2 * | 4/2016 | DeLoach, Jr. | ............... | A47F 7/00 |
| 2004/0168939 A1 * | 9/2004 | DeShazer | ............... | A63B 47/00 206/315.9 |
| 2006/0063621 A1 * | 3/2006 | Bell | ............... | A63B 47/00 473/569 |
| 2007/0119888 A1 * | 5/2007 | Chuang | ............... | B62J 11/00 224/427 |
| 2007/0259731 A1 * | 11/2007 | Barouh | ............... | A63B 47/02 473/282 |
| 2008/0251555 A1 * | 10/2008 | Andrews | ............... | B62J 11/00 224/427 |
| 2010/0059564 A1 * | 3/2010 | Bretl | ............... | A45F 3/16 224/414 |
| 2010/0264184 A1 * | 10/2010 | Retief | ............... | B62J 11/00 224/427 |
| 2010/0326854 A1 * | 12/2010 | Ting | ............... | A45F 3/14 206/315.9 |
| 2016/0159422 A1 * | 6/2016 | Davis | ............... | B62J 9/001 206/315.9 |

* cited by examiner

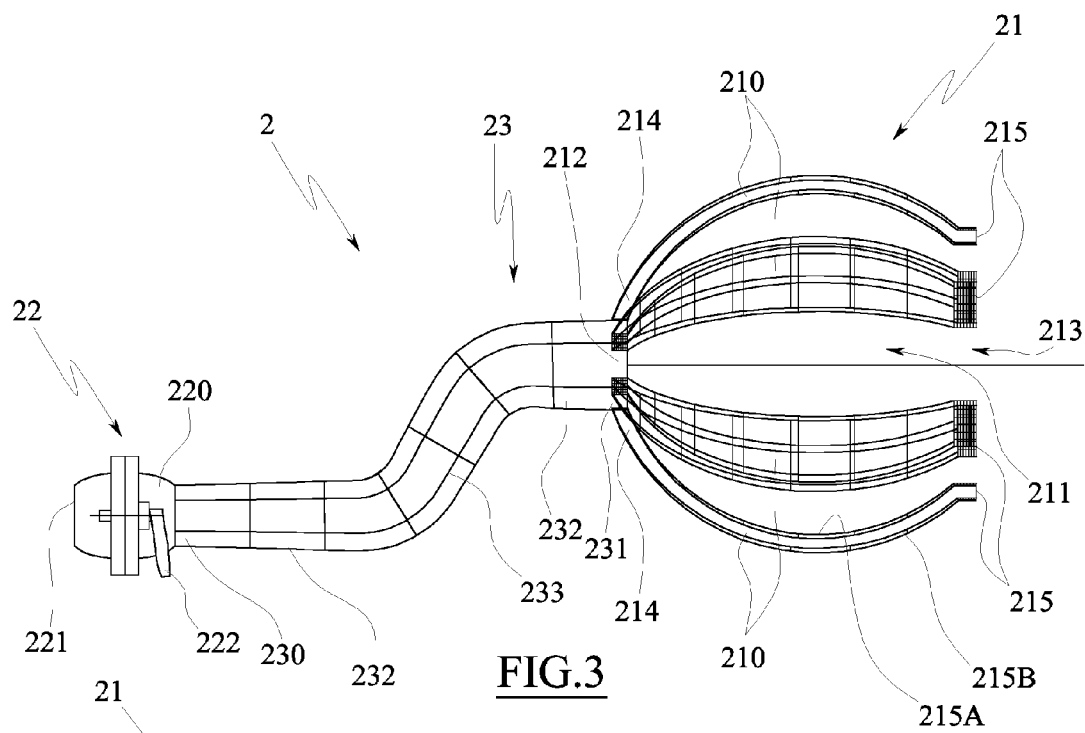
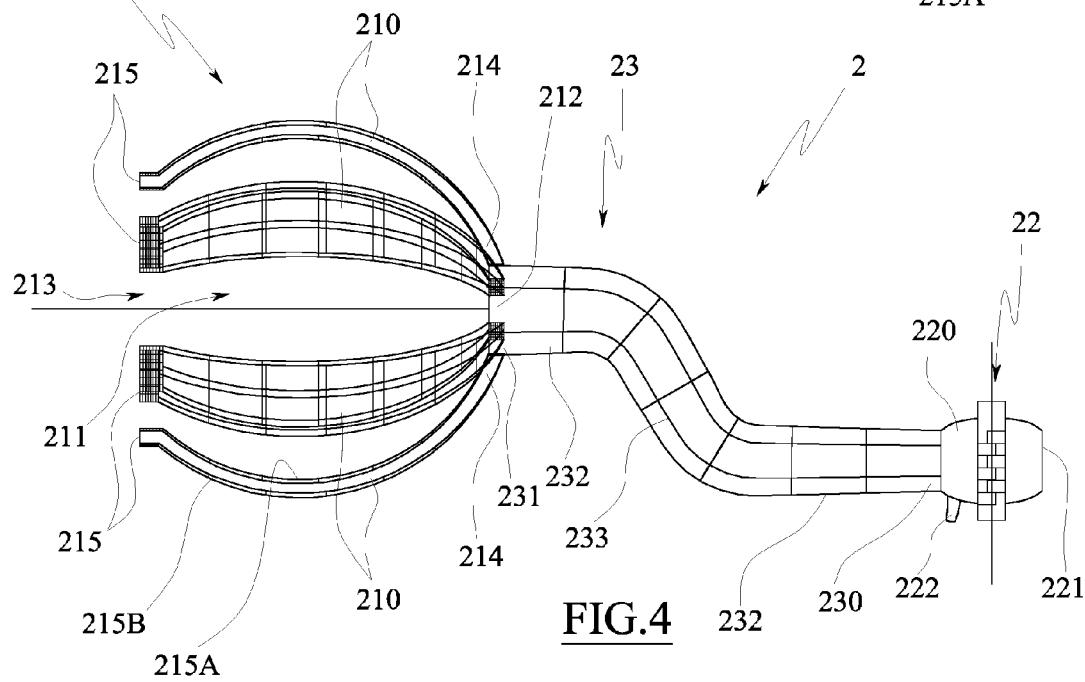

SUPPORT FOR BALLS AND A BICYCLE PROVIDED WITH THE SUPPORT FOR BALLS

FIELD OF THE INVENTION

The present invention regards a support for balls.

In particular, the invention regards a support for balls and a bicycle comprising said support for balls.

BACKGROUND

As known, the use of bicycles as a means of transport for any category of people is very frequent.

The use of the bicycles is particularly common especially, but not exclusively, for the youth both for transporting people and fun.

In particular, youths, especially boys, preferably use bicycles, such as for example mountain bikes, without baskets, luggage carrier and other object carriers.

In the absence of baskets and luggage carriers it is difficult and dangerous, especially for children and youths, to carry voluminous objects like balls, such as for example footballs, basketballs, volleyballs, rugby balls or the like, in that the rounded shape of the same is difficult to grip and hold firmly.

In particular in absence of a luggage carrier one is forced to carry the ball either, in a bag, for example paper bag, hung on the handlebar of the bicycle with the possibility that it interferes with the rotating wheels, or in one hand thus not using the handlebar and brakes safely with both hands.

However, in this context, the bicycle is more difficult to maneuver and definitely more difficult.

In addition, even the use of supports fixed to the bicycles, like baskets or luggage carrier is not always suitable to transporting balls with a bicycle, in that, due to portholes or unevenness of the ground, the ball is subject to stresses that may cause it to bounce and dangerously exit from the support during the motion of the bicycle.

An object of the present invention is to overcome the aforementioned drawbacks of the prior art, through a simple, rational and inexpensive solution.

The objects are attained by the characteristics of the invention outlined in the independent claim. The dependent claims outline preferred and/or particularly advantageous aspects of the invention.

SUMMARY

An embodiment of the invention, particularly, provides a support for balls which comprises: a receiving element provided with a plurality of gripping resilient and arched members adapted to define a gripping volume of a ball, in which each gripping member has an end constrained in a joining body and a free end, a coupling body adapted to constrain the receiving element to a tubular support structure, in which the coupling body is constrained to the receiving element by means of a longitudinal spacer element, whose first end is constrained to the coupling body and a second end is constrained to the receiving element.

In practice, the spacer element is adapted to be interposed between the receiving element and the coupling body spacing them along the longitudinal axis of the spacer element.

This solution allows providing a support for balls constrainable to a tubular support structure, for example a framework of a bicycle, capable of allowing holding a ball during transportation in an efficient manner and under safe conditions, at a distance from the tubular element.

According to an aspect of the invention, the gripping members are mobile in opposition to an elastic thrust force from a mutually approached position to a diverged position.

Thus, the ball is efficiently held in the gripping volume of the receiving element, in that it is necessary to overcome the elastic force of the gripping members to introduce and remove the ball from the gripping volume.

According to another aspect of the invention, the free ends of the gripping members are mutually joined by at least one elastic annular body.

Thanks to this solution, the gripping members are helped to remain, in use, in the approached position to avoid the unwanted release of the ball, for example, following accidental stresses that may occur, for example, during the motion of a bicycle.

According to another aspect of the invention the gripping members are removably associated to the joining body.

This solution allows removing or constraining the gripping members to the joining body at will so as to reduce the overall dimension of the support for balls for example in case of packaging, storage or extended sheltering.

According to another aspect of the invention, the gripping members are made in a single piece with the joining body.

Thus, the receiving element in particular and the support for balls are generally robust, simple as well as inexpensive to create and manufacture.

According to a further aspect of the invention, the coupling body is adapted to removably constrain the receiving element to the tubular support structure.

This solution allows removing or constraining the support for balls to the tubular support structure whenever required.

According to a further aspect of the invention, the coupling body comprises a clamp element adapted to clutch the tubular support structure.

Thus, the support for balls can be constrained to the tubular support structure in a simple, quick and efficient manner through a coupling body that is easy to obtain and inexpensive.

In addition, the invention provides a bicycle comprising a bearing frame provided with a tubular support structure, and comprising a support for balls which comprises: a receiving element provided with a plurality of gripping resilient and arched members adapted to define a gripping volume of a ball, as described above.

Thus, there is provided a bicycle comprising a support for balls in capable of firmly holding a ball in a gripping volume suitably spaced from the support framework of the bicycle, thus preventing the unwanted exit in case of stresses due to portholes or ground unevenness during the motion of the bicycle.

Thus, in addition the transportation of the ball will occur under safe conditions without occupying the hands of the user and without interfering with the wheels or the framework of the bicycle thanks to the spacer element.

According to an aspect of the invention, the bicycle comprises at least one pair of wheels, rotatably associated to the framework, in which the support for balls is adapted to be constrained to the tubular support structure substantially superimposed, in plan view, on one of the wheels.

Thanks to this solution, the ball is supported in a position that does not interfere with the wheels of the bicycle or with the maneuverability of the bicycle, thus guaranteeing the use of the bicycle under safe conditions.

BRIEF DESCRIPTION OF THE DRAWINGS

Further characteristics and advantages of the invention shall be apparent from reading the following description provided by way of non-limiting example, with reference to the figures illustrated in the attached drawings.

FIG. 3 is a lateral view of FIG. 2 from the right.

FIG. 4 is a lateral view of FIG. 2 from the left.

DETAILED DESCRIPTION OF THE PREFERRED EMBODIMENTS

Figure 1:
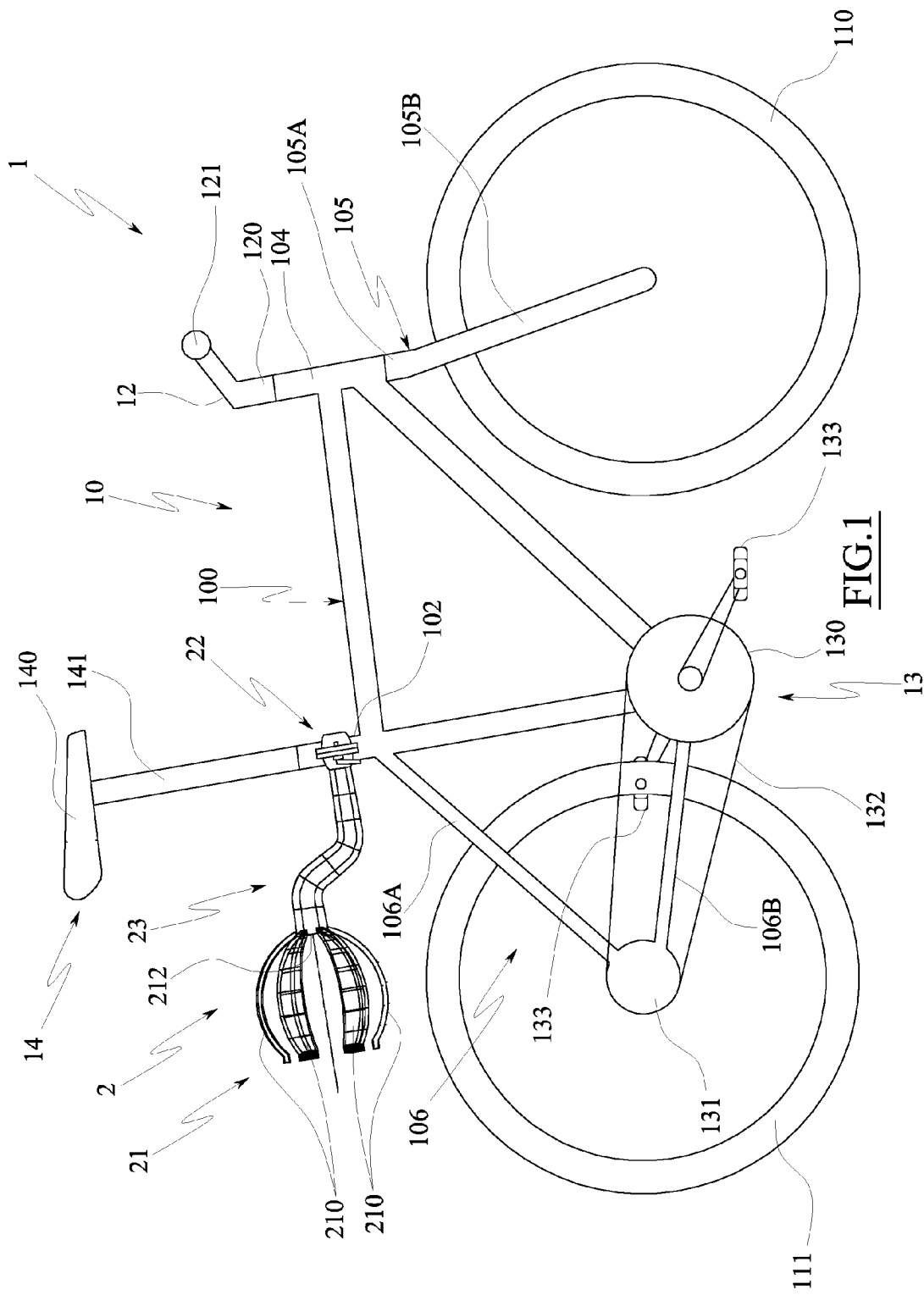
FIG. 1 is a lateral view of a bicycle provided with a support for balls according to the present invention.
Figure 2:
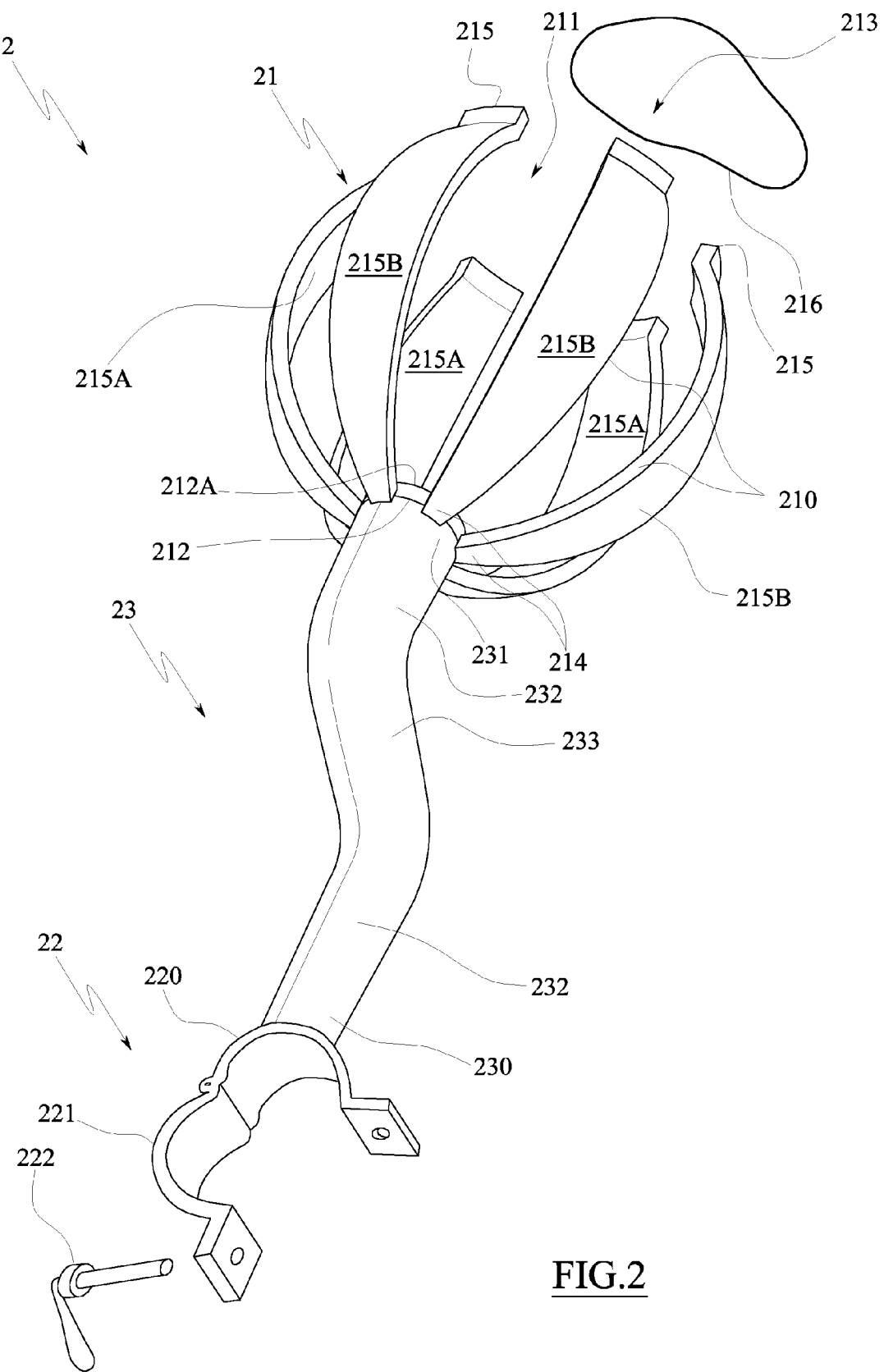
FIG. 2 is an axonometric view of a support for balls according to the present invention.
Figure 5:
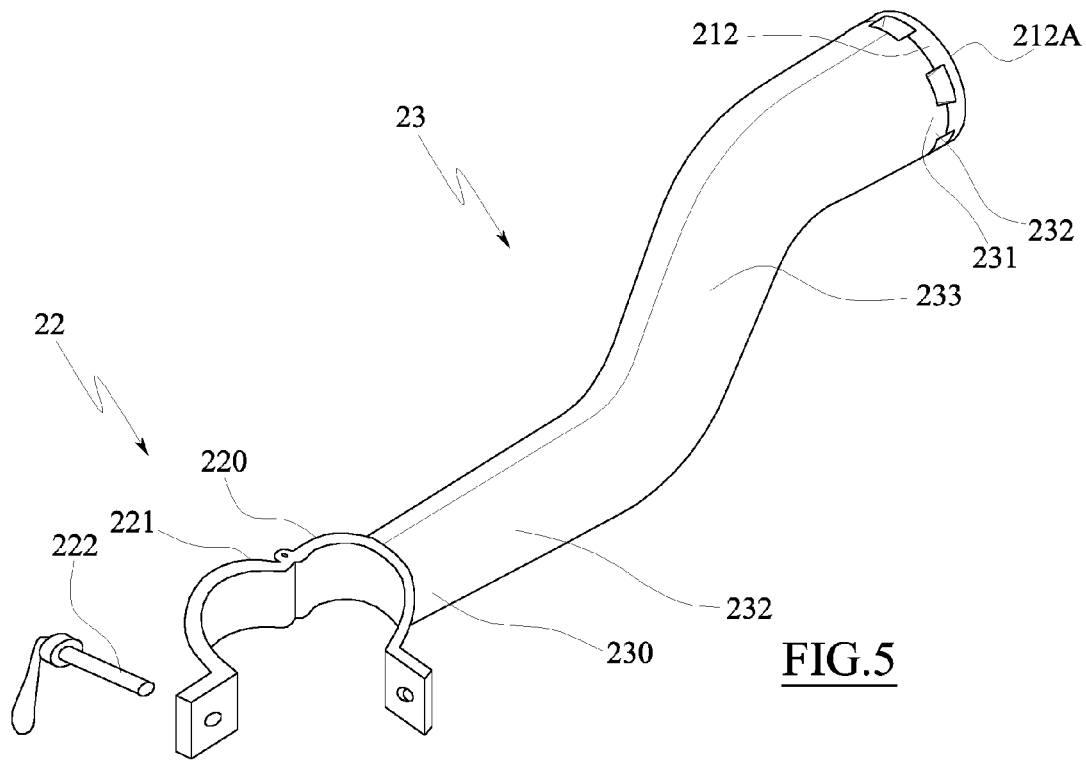
FIG. 5 is an axonometric view of a spacer element of a variant support for balls according to the present invention.
Figure 6:
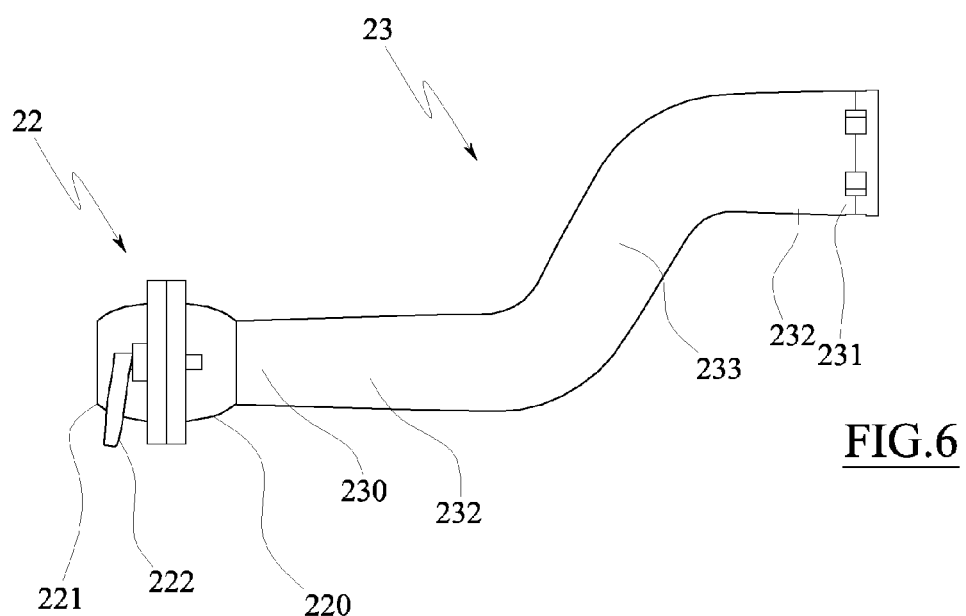
FIG. 6 is a lateral view of FIG. 5.
Figure 7:
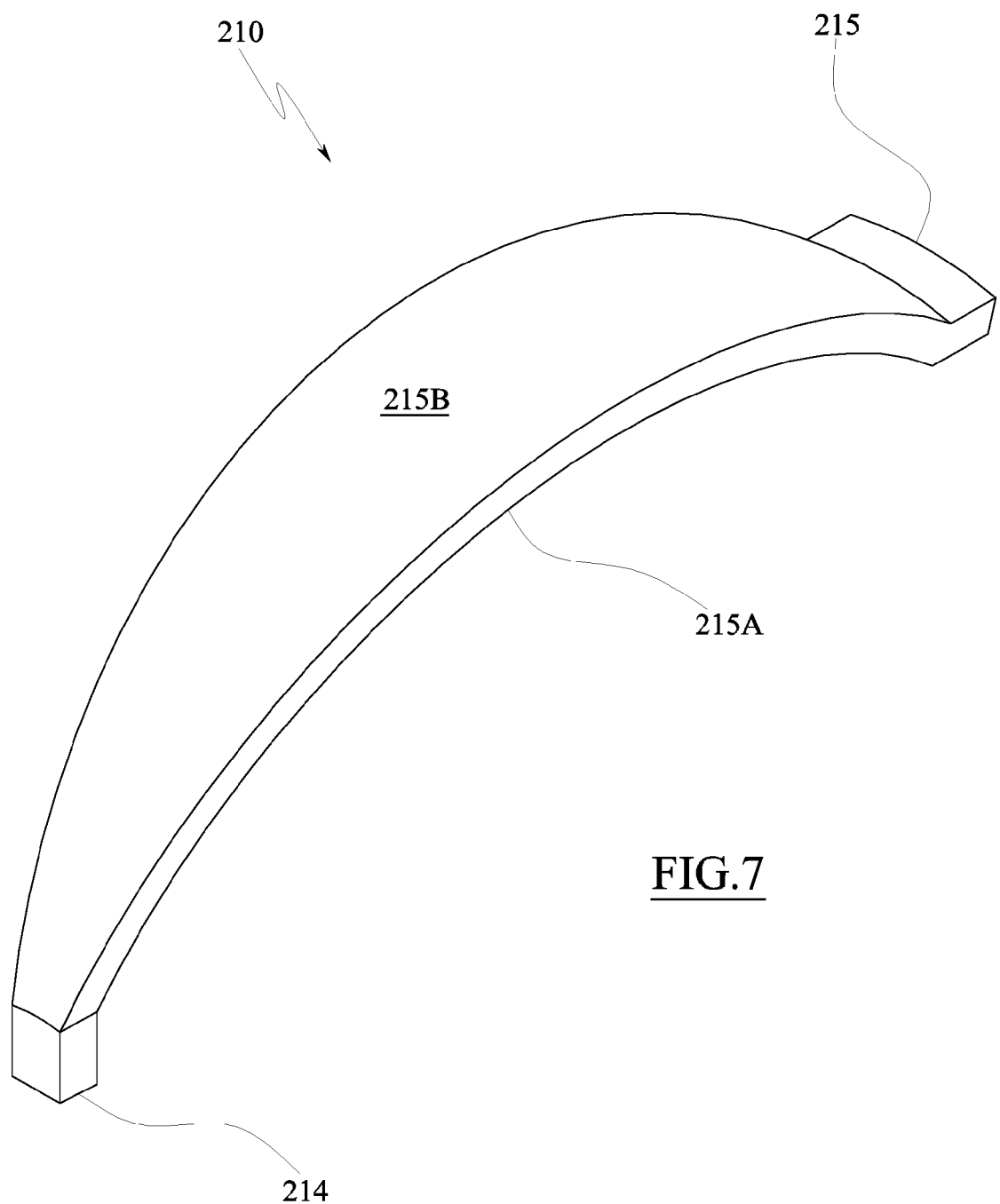
FIG. 7 is an axonometric view of a gripping member which can be associated to the spacer element of FIG. 5-6.
Figure 8:
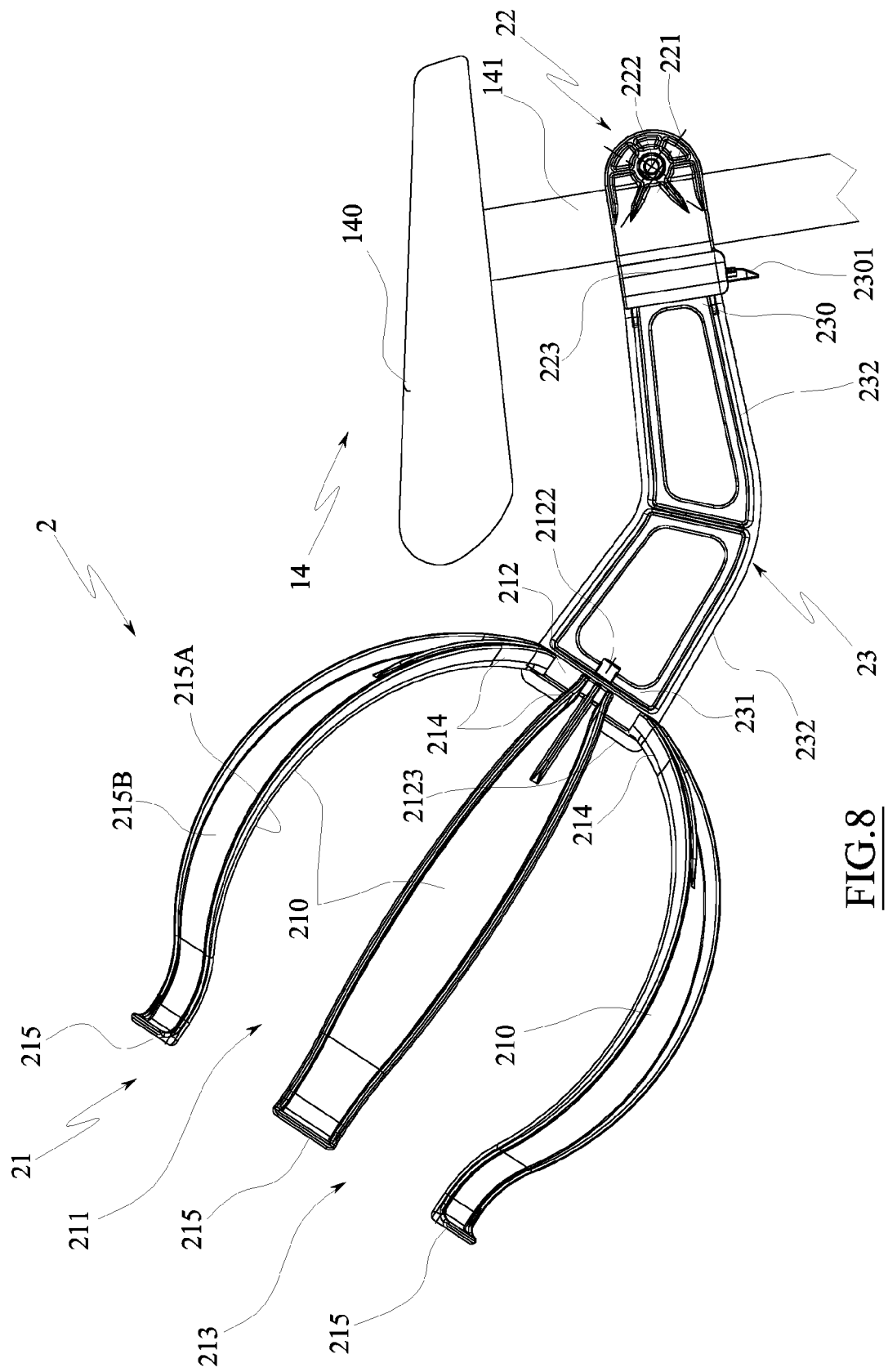
FIG. 8 is a lateral view of a variant of a support for balls according to the present invention fixed to a support stem of a saddle of a bicycle.
Figure 9:
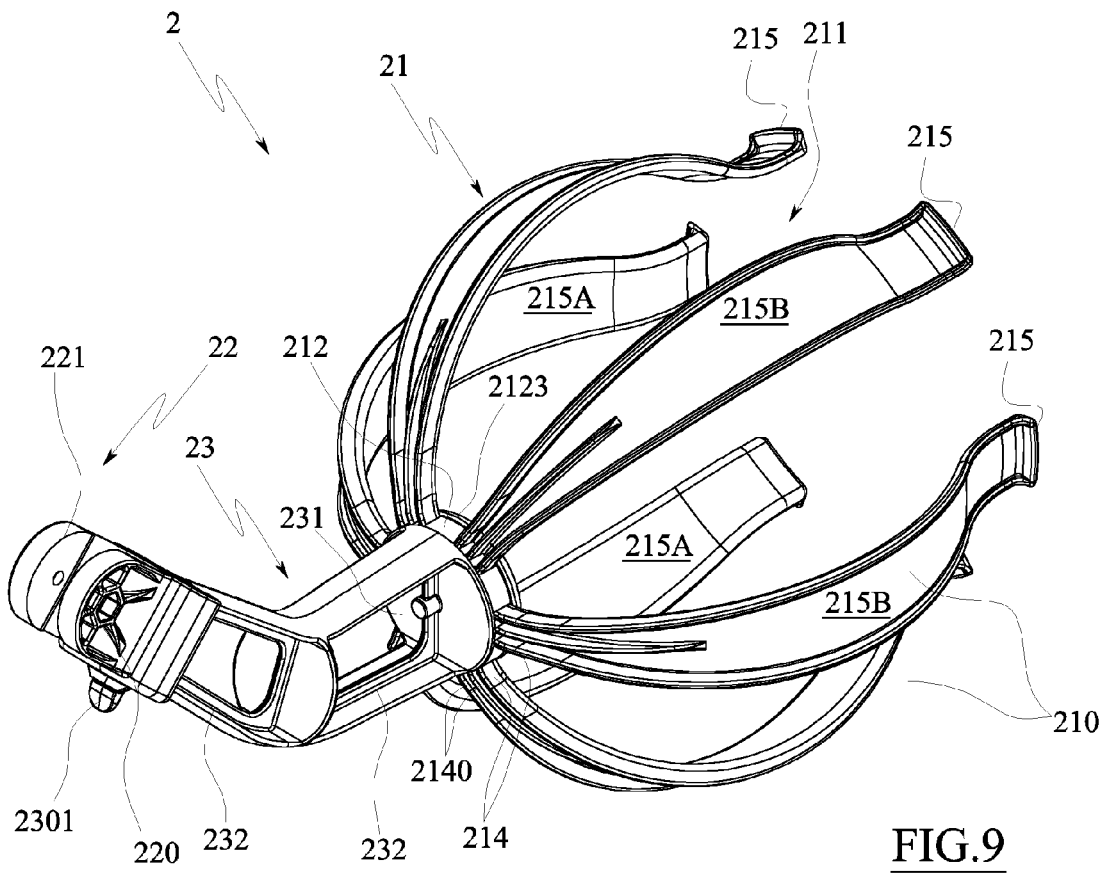
FIG. 9 is an axonometric view of the support for balls of FIG. 8.

With particular reference to such figures, a bicycle, for example a mountain bike, a city bike or the like is indicated in its entirety with 1.

The bicycle 1 comprises a bearing frame 10 adapted to rest against the ground by means of a pair of wheels 110,111 and, for example, it comprises a support for balls 2 associated to the bearing frame 10 and adapted to hold at least one ball, for example a football, basketball, volleyball, rugby ball or a ball for other sports.

The bearing frame 10 is provided with a tubular support structure 100 comprising a plurality of tubular elements 101,102,103 fixed to each other, for example welded or made in a single body.

The tubular support structure is substantially triangular-shaped.

In particular, the tubular elements 101,102,103 are fixed to each other so as to substantially form a triangle having a first tubular element 101, arranged at the upper part with respect to the other tubular elements 102,103, substantially parallel to the support ground, a second tubular element 102 arranged substantially perpendicular to the ground, for example vertical, and a third tubular element 103 arranged oblique with respect to the ground.

The bearing frame 10 comprises a cylindrical sleeve 104 arranged substantially at an upper vertex, of the tubular support structure 100, defined by the abutment between the first and the third tubular element 101,103 and directed with axis substantially perpendicular to the ground.

The cylindrical sleeve 104 is internally hollow and it is open at the upper and lower part.

The bearing frame 10 further comprises a fork 105 rotatably associated to the cylindrical sleeve 104, to which a front wheel 110 is rotatably associated with respect to a substantially horizontal rotational axis substantially.

In particular the fork 105 comprises a cylindrical stem 105A adapted to be rotatably inserted, for example substantially fittingly, in the cylindrical sleeve 104.

The fork 105 further comprises a pair of parallel appendages 105B, projecting at the lower part from the cylindrical sleeve 104, adapted to be arranged adjacent to the front wheel 110 and adapted to be rotatably associate to a hub, not shown, of the front wheel 110.

The bicycle 1 further comprises a handlebar 12, for maneuvering the bicycle 1 while moving, adapted to be rotatably associated to the cylindrical sleeve 104.

In particular the handlebar 12, comprises a stem 120 adapted to be inserted substantially fittingly in the cylindrical sleeve 104 and integrally associated to the stem 105a of the fork 105 in the cylindrical sleeve 104.

The handlebar 12 further comprises a pair of knobs 121 associated to the stem 120 of the handlebar.

The knobs 121 are adapted to be grasped by an operator who may rotate the handlebar with respect to an axis substantially perpendicular to the ground and coinciding with the axis of the cylindrical sleeve 104.

The handlebar 12 is adapted to drive the fork 105 in rotation around the axis of the cylindrical sleeve 14 and, thus, the front wheel 110 associated thereto to allow the bicycle 1 to change directions when moving.

The bearing frame 10 further comprises a rear carriage 106 arranged substantially at the rear part with respect to the second tubular element 102 and adapted to rotatably support a rear wheel 111.

The rear carriage 106 comprises a pair of lower casings 106A, in each lower casing 106A being arranged substantially horizontal and parallel to the ground and being associated at one end to the lower vertex of the tubular support structure 100 defined by the abutment between the second and the third tubular element 102,103.

The rear carriage 106 further comprises a pair of upper casings 106B, in which each upper casing 106B is arranged inclined with respect to the ground and it is associated, at one end, to the upper vertex of the tubular support structure 100 defined by the abutment between the first and the second tubular element 101,102 and, at the other end, to the end of one of the lower distal casings 106A with respect to the tubular support structure 100.

Thus, the rear carriage 106 comprises a pair of triangles, each delimited by one of the lower casings 106A, the upper casing 106B associated thereto, and by a second tubular element 102.

In particular, the rear carriage 106 comprises a pair of triangles, as described above, arranged adjacent and spaced from each other so as to define an imaginary pocket adapted to at least partly house a rear wheel 111 comprising a hub, not shown, which is rotatably associated to the vertex of the triangles defined by the abutment between the upper casings 106B and the lower casings 106A.

The bicycle 1 further comprises a chain mechanism 13 comprising at least one first gear wheel 130 rotatably associated to the tubular support structure 100, substantially at the lower vertex of the tubular support structure 100 defined by the abutment between the second and third tubular element 102,103, with parallel axis with respect to the ground.

The chain mechanism 13 further comprises at least one second gear wheel 131 rotatably associated to the rear carriage 106 at the lower vertex of the rear carriage 106, defined by the abutment between the upper casings 106B and the lower casings 106A, with parallel axis with respect to the ground.

The second gear wheel 131 is associated coaxial to the rear wheel 111 and it is rotatably joined integral thereto.

The first and the second gear wheel 130,131 are mechanically connected to each other by means of a transmission chain 132 adapted to be wound on the first and the second gear wheel 130,131 meshing the respective gears thereof.

The chain mechanism 13 further comprises a pair of pedals 133 associated to the first gear wheel 130 and arranged on opposite sides of the bearing frame 10, and in diametrically opposite positions with respect to the first gear wheel 130.

The operator may actuate the pedals 133 in rotation around the axis of the first gear wheel 130, rotatably driving the first gear wheel 130 which in turn, thanks to the transmission chain 132, rotatably actuates the second gear wheel 131 and thus the rear wheel 111 actuating the movement of the bicycle 1.

The bicycle 1 further comprises a saddle 14 associated, in a height adjustable manner, to the bearing frame 10 at the upper vertex of the tubular support structure 100 defined by the abutment point between the first and the second tubular element 101,102.

In particular the saddle 14 comprises a seat 140 adapted to be supported by a support stem 141.

The support stem 141 is adapted to be inserted, at the upper part, inside the second tubular element 102 which is internally hollow.

Particularly, in order to attain the objects of the present invention, the support for balls 2 comprises a receiving element 21 provided with a plurality of gripping resilient and arched members 210 adapted to define a gripping volume 211 of a ball, for example substantially spherical.

The gripping members 210 are constrained to a joining body 212, for example central.

In particular the joining body 212 is substantially shaped to form a variously shaped disc or plate and comprises a front face 212A facing towards the concavity of the receiving element 21, and an opposite rear face.

The gripping members 210 depart from the joining body 212, for example from points aligned on an imaginary circumference so as to at least partly delimit the gripping volume 211.

In particular the gripping members 210 project from the joining body 212 so that their concave face faces towards the front face 212A with concavity facing towards the central axis of the joining body 212, so as to define a substantially spherical or ogival gripping volume 211.

The gripping members 210 are uniformly distributed around the central axis of the joining body 212 and, for example, are equally spaced with respect to each other.

The receiving element 21 comprises at least three gripping members 210 angularly spaced from each other by 120°.

In the embodiment shown in the figures, the receiving element 21 comprises six gripping elements 210 angularly spaced from each other by 60°.

Each gripping member 210 is substantially shaped to form a spherical lune i.e. it comprises a central portion with greater width with respect to the end portions and it is substantially arc-shaped.

In particular each gripping member 210 comprises an end 214 constrained to the coupling body 212 and an opposite free end 215.

The free ends 215 of the gripping members 210 delimit an opening 213 for access to the gripping volume 211.

For example one or more of the gripping members 210, for example at the free ends 215, or fixed to a portion of the support for balls 2, may be fixed or associated to a light-reflecting element adapted to improve the night and/or night visibility of the support for balls 2 and the bicycle 1.

The gripping members 210 are mobile in opposition to an elastic thrust force from a mutually approached position to a diverged position.

In particular the gripping members 210 are mobile in opposition to an elastic thrust force from an approached position, in which the free ends 215 can be approached to each other to a diverged position in which the free ends 215 are spaced from each other, so as to widen the access opening 213.

The free end 215 of each gripping member 210 is, for example, slightly folded towards the external of the gripping volume 211, for example it is substantially parallel to the axis of the joining body 212.

In particular the free ends 215 of each gripping member 215 comprise an internal surface 215A (without interruption with the internal surface of the gripping member 210) delimiting the access opening 213 and an opposite external surface 215B.

The internal surface 215A (same case applying to the internal surface of each gripping member 210) of each free end 215 is adapted to define a surface for the abutment and holding of a ball to be housed in the gripping volume 211, which—pressing on the internal surfaces 215A from the internal—actuates the gripping members 210 to bend with respect to the respective constrained ends 214 in opposition to the elastic force acting on the gripping members from the approached position to the diverged position.

The gripping members 210 may be made of a single body with the joining piece 212, which is for example in turn made in a single body with the spacer element 23.

Alternatively, the gripping members 210 may be removably constrained to the joining body 212, as shown in the figures, for example through a bayonet coupling, which however allows the bending thereof towards the opening of the concavity.

In this case, the joining body 212 is defined integrally joined to the spacer element 23 (i.e. in a single body with respect thereto).

In particular the joining body 212 comprises a plurality of seats uniformly and circumferentially distributed substantially at the perimeter edge thereof, in which each seat is adapted to house and hold a stem with shape matching the shape of the seat associated to the constrained end 214 of each gripping member 210.

In the example shown in FIGS. 8 to 13 (which as regards the parts functionally and structurally identical to the first embodiment are illustrated with the same reference numbers as FIGS. 1 to 7), the joining body 212, which in practice defines a disc-shaped end of the spacer element 23, comprises a plurality of radial seats 2120 (for example radially open towards the external and at the upper part).

Advantageously, in each radial seat 2120 there is arranged one (or more) crest 2121 rising from the bottom of the radial seat, whose end (not shown) facing towards the center of the joining body 212, is separated from the ends facing towards the center of the crests 2121 of the other radial seats 2120.

At the center of the joining body 212 there is arranged a threaded hole 2122 at least open at the central joining area of the radial seats 2120.

Figure 13:
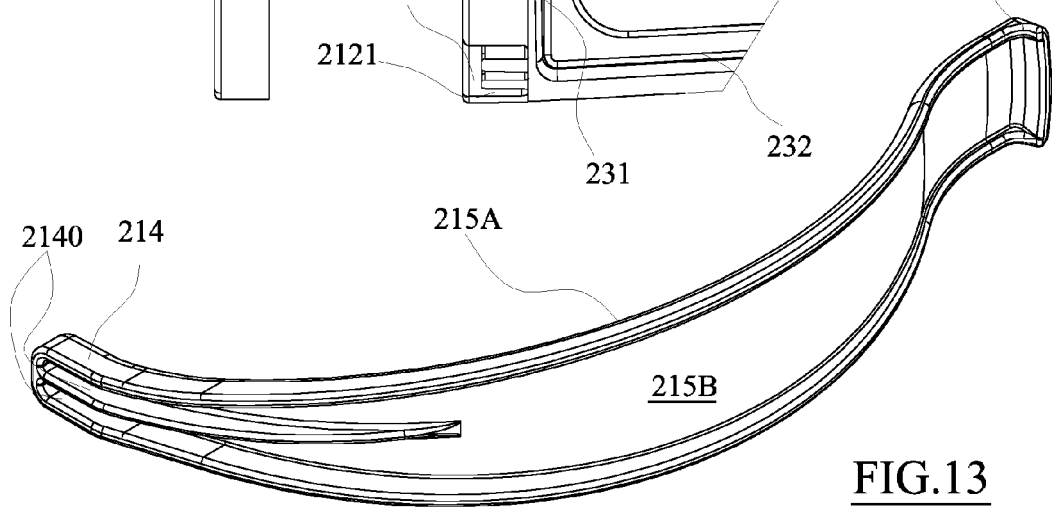
FIG. 13 is an axonometric view of a fourth detail of the support for balls of FIG. 8.

Each gripping member 210 (as shown in the detail of FIG. 13) has a constrained end 214 which is adapted to define removable shape constraint with the radial seat 2120.

In the illustrated example, the constrained end 214 has one (or more) groove 2140, for example closed on the tip point side of the constrained end 214, in which a respective crest 2121 can be inserted with little clearance or substantially by interference. In practice, the constrained end 214 is adapted to enter for example fittingly in a respective radial seat 2120 and, through the connection between the crest 2121 and the groove 2140, the gripping member 210 is hindered from slipping off (radial with respect to the radial seat) from the radial seat.

Once each radial seat 2120 is engaged by a respective gripping member 210, as described above, the radial seats 2120 are closed (at the upper part) by a closing plate 2123 (see FIG. 12) which, having a central hole (not shown), can be fixed, for example through a screw 2124 which is engaged in the threaded hole 2122, to the joining body 212.

In practice, the constrained ends 214 of the gripping members 210 are clamp-held between the joining body 212 and the closing plate, by fastening just one screw, using a closing plate 2123.

It cannot be excluded that between the closing plate 2123 and the joining body 212 there be fixed different fixing members with respect to the screw 2124, such as for example snap-coupling or bayonet-coupling or other similar coupling elements.

Advantageously, the receiving element 21 may be made of any type of plastic material, for example flexible or elastomeric, such as for example polyurethane or polyethylene.

The receiving element 21 may further comprise at least one elastic annular body 216 (seen in exploded view only in FIG. 2) adapted to contour the access opening 213 so as to limit the opening bending of the gripping members 210.

In particular, the elastic annular body 216 is adapted to house free ends 215 of the gripping members 210 in an annular seat defined by the external surfaces 215B.

The elastic annular body 216, when housed in the annular seat defined by the external surfaces 215B, is adapted to press on the external surfaces 215B to force/push the gripping members 210 in the approached position increasing the elastic force acting on the gripping means 210 so as to prevent the unwanted widening of the access opening 213.

The elastic annular body 216 may be, for example, an elastic lace or a variable diameter ring.

The support for balls 2 comprises a coupling body 22 adapted to constrain the receiving element 21 to the tubular support structure 100.

The coupling body 22 is constrained to the receiving element 21 by means of a longitudinal spacer element 23, whose first end 230 is constrained to the coupling body 22 and a second end 231 is constrained to the receiving element 21, for example at the rear part with respect thereto at the rear face of the joining body 212.

Advantageously the coupling body 22 is adapted to removably constrain the receiving element 21 to the tubular support structure 100.

In particular the coupling element 22 comprises a clamp element adapted to clutch the tubular support structure 100.

The coupling element 22 comprises a pair of clamps, whose one first and one second clamp 220,221, shaped to form an arc and, for example substantially, hinged to each other and actuatable mutually approaching or moving away from each other, adapted to circumferentially wrap the tubular support structure 100.

In particular, in the example shown in FIGS. 1 to 7, the coupling element 22 comprises a first clamp 220 constrained to the spacer element 23 and a second clamp 221 hinged to the first clamp 221 and moveable with respect to the first clamp 220 approaching or moving away with respect to the first clamp.

Each first and second clamp 220,221 comprises an end hinged to an end of the other clamp 220,221, and a free end.

Figure 10:
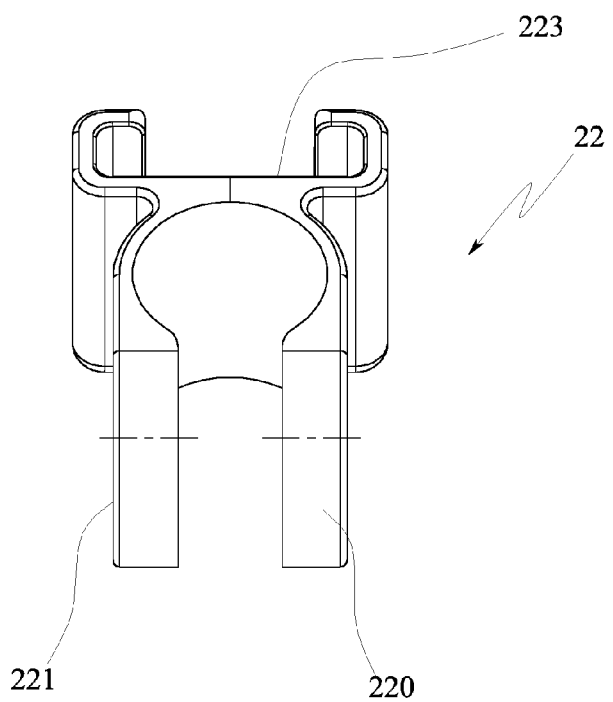
FIG. 10 is a front view of a first detail of the support for balls of FIG. 8.
Figure 11:
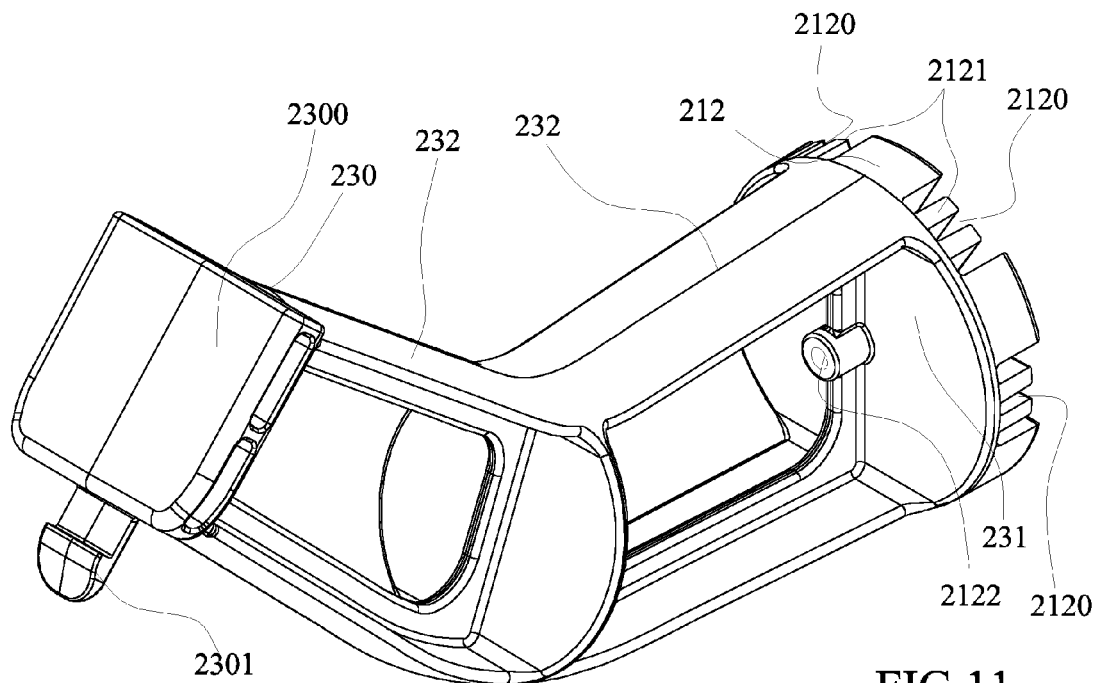
FIG. 11 is an axonometric view of a second detail of the support for balls of FIG. 8.
Figure 12:
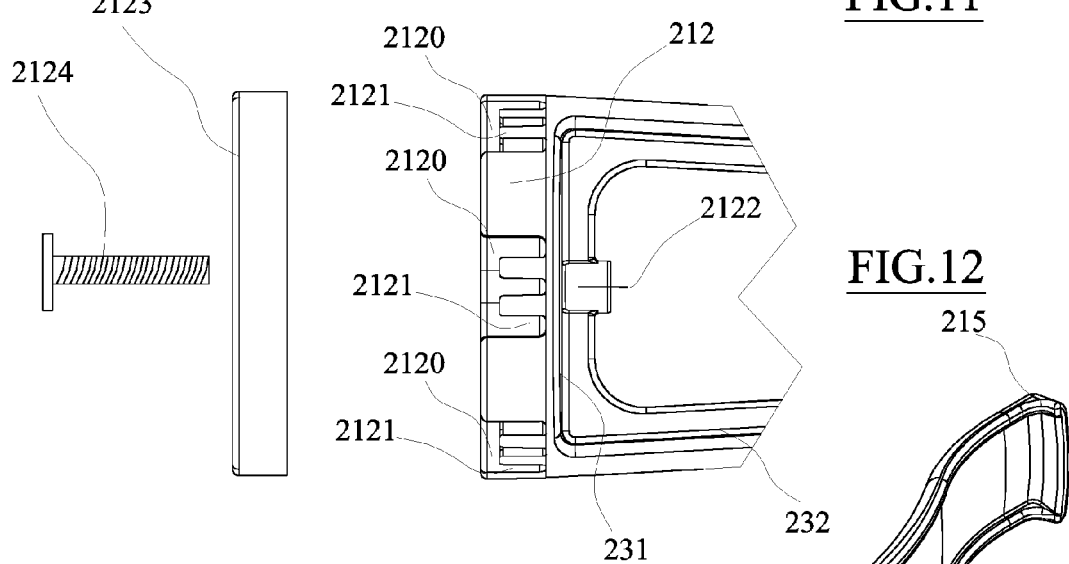
FIG. 12 is a lateral exploded view of a third detail of the support for balls of FIG. 8.

In the example shown in FIGS. 8 to 13, with particular reference to FIG. 10, the coupling element 22 is removably associated to the spacer element 23.

Preferably, the coupling element 22 comprises a first and a second clamp 220,221 each provided with a respective common end and an opposite free end. The clamps 220,221 are made of elastically yieldable material, such as plastic material, so that they can be widened, fitted on the tubular support structure 100 and clamp-fastened thereon.

The common ends of the clamps 220,221 are joined by a body defining a coupling seat 223, for example a slide (with axis parallel to the through axis of the clamps 220,221). For both shown embodiments, the coupling element 22 further comprises a fastening element 222 adapted, in use, to lock the clamps 220,221 in approached position i.e. hinder the mutual moving away of the clamps 220,221 when the latter wrap the tubular support structure 100.

The fastening element 222 comprises, for example, a fastening screw or a hook-like element adapted to constrain the free ends of the first and second clamp 220,221 to each other.

The longitudinal spacer element 23 comprises a first end 230 constrained to the coupling body 22 (for example with a central portion of the first clamp 220) and a second end 231 constrained to the receiving element 21 (for example to the joining body 212).

In the example shown in FIGS. 8-13, the first end 230 has a coupling body 2300 adapted to be substantially fitted in the coupling seat 223 (for example through an axial sliding, according to a prismatic connection) and provided with a hook 2301 adapted to constrain the mutual actual sliding (removably) once the coupling body 2300 is contained in the coupling seat 223.

The spacer element 23 has for example a curvilinear longitudinal axis, for example substantially S-shaped.

In the example shown in FIGS. 1 to 7, the spacer element 23 has a curvilinear longitudinal axis with double curvature.

In practice, the spacer element 23 comprises two longitudinal end portions 232, for example substantially parallel to each other and adapted to be arranged substantially parallel to the axis of the joining body 212 (orthogonal to the joining body), and comprises an intermediate position 233, interposed between the end portions 232 and transverse with respect to the longitudinal direction of the end portions.

In the example shown in FIGS. 8 to 13, the spacer element 23 has a curvilinear longitudinal axis with single curvature.

For example, the spacer element 23 comprises due end portions 232 inclined with respect to each other, for example by an obtuse angle.

In addition, in the example illustrated in FIGS. 8 to 13, the spacer element 23 has lightening transverse holes, in practice; the spacer element 23 is configured to substantially form a particularly light and aerodynamic honeycomb.

In both embodiments (FIGS. 1 to 13), one of the end portions 232, of the spacer element 23, which comprises and ends with the second end 231 constrained to the receiving element 21, is arranged, in use, at a level (from the ground) greater than the other end portion 232 comprising the first end 230 constrained to the coupling body 22.

The spacer element 23 is substantially rigid, thus being substantially non-deformable (for example with respect to bending and pulling).

Advantageously the spacer element 23 is made of any plastic material, for example the same material the receiving element 21 is made of, and it has a thickness at least twice (for example five times) greater than the thickness of the gripping members 210.

The support for balls 2 is adapted to be constrained cantilevered with respect to the tubular support structure 100 of the bearing frame 10, for example at the rear part, and, as shown preferably, above the rear wheel 111 of the bicycle 1 (or alternatively above of the front wheel 110).

In particular the support for balls 2 is adapted to be constrained to the tubular support structure 100, for example to the second tubular element 102 or, preferably, to the support stem 141 of the saddle 14, substantially superimposed, in plan view, to the rear wheel 111 above the rear carriage 106 of the bearing frame 10.

In practice, the receiving element 21 is supported cantilevered and spaced from the bearing frame 10 (and the rear wheel) by means of the spacer element 23 constrained to the bearing frame by means of the coupling body 22.

Once the support for balls 2 is fixed to the bearing frame 10, the user may insert a ball in the gripping volume 211, of the receiving element 21, pressing it against the internal surface 215a of the gripping members 210 so as to actuate the gripping members 210 from the approached position to the diverged position in opposition to the elastic force acting on the gripping members and allowing the passage of the ball through the access opening 212.

When the ball is inserted in the gripping volume 211, the gripping members 210, which return to the approached position elastically, stably embrace the ball (in every direction), hindering the inadvertent exit of the ball.

Thus the user may easily transport the ball which will remain firmly anchored to the bicycle 1 and remove it at will.

The invention thus conceived, can be subjected to numerous modifications and variants all falling within the inventive concept.

In addition, all details can be replaced by other technically equivalent elements.

In practice the materials used, as well as the shape and contingent dimensions, may vary depending on the requirements without departing from the scope of protection of the claims that follow.

The invention claimed is:

1. A support for balls (2) comprising:
 a receiving element (21) provided with a plurality of resilient and arched gripping members (210) adapted to define a volume (211) for gripping a ball, wherein each gripping member (210) has an end (214) constrained in a joining body (212) and a free end (215),
 a coupling body (22) adapted to constrain the receiving element (21) to a tubular support structure (100),
 wherein the coupling body (22) is constrained to the receiving element (21) by means of a longitudinal spacer element (23), whose first end (230) is constrained to the coupling body (22) and a second end (231) is constrained to the receiving element (21),
 wherein the gripping members (210) are removably associated to the joining body (212), and
 wherein the joining body (212) comprises a plurality of seats uniformly and circumferentially distributed at the perimeter edge thereof, wherein each seat is adapted to house and hold a stem with a shape matching a shape of the seat associated to the constrained end (214) of each gripping member (210) and wherein each seat is closed by a closing plate (2123) removably fixed to the joining body (212) by a fastener.

2. The support (2) according to claim 1, wherein the gripping members (210) are mobile in opposition to an elastic thrust force from a mutually approached position to a diverged position.

3. The support (2) according to claim 1, wherein the free ends (215) of the gripping members (210) are mutually joined by at least one elastic annular body (216).

4. The support according to claim 1, wherein the spacer element (23) has a curvilinear longitudinal axis.

5. The support (2) according to claim 1, wherein the coupling body (22) is adapted to removably constrain the receiving element (21) to the tubular support structure (100).

6. The support (2) according to claim 5, wherein the coupling body (22) comprises a clamp element adapted to clutch the tubular support structure (100).

7. A bicycle (1) comprising a bearing frame (10) provided with a tubular support structure (100), and comprising a support for balls (2) according to claim 1, wherein the coupling body (22) is adapted to constrain the receiving element (21) to the tubular support structure (100) by means of the longitudinal spacer element (23).

8. The bicycle (1) according to claim 7, further comprising at least one pair of wheels (110,111), whose one front wheel (110) and one rear wheel (111), rotatably associated to the framework (10), wherein the support for balls (2) is adapted to be constrained to the tubular support structure (100) substantially superimposed, in plan view, to the rear wheel (111).

9. The bicycle (1) according to claim 7, wherein the support for balls is constrained to a vertical tubular element (102) of the bicycle (1) or to a support stem (141) of a saddle (14).

* * * * *